H. B. MASON.
WIND SHIELD FOR AUTOMOBILES.
APPLICATION FILED JULY 7, 1916.
1,317,520.  Patented Sept. 30, 1919.
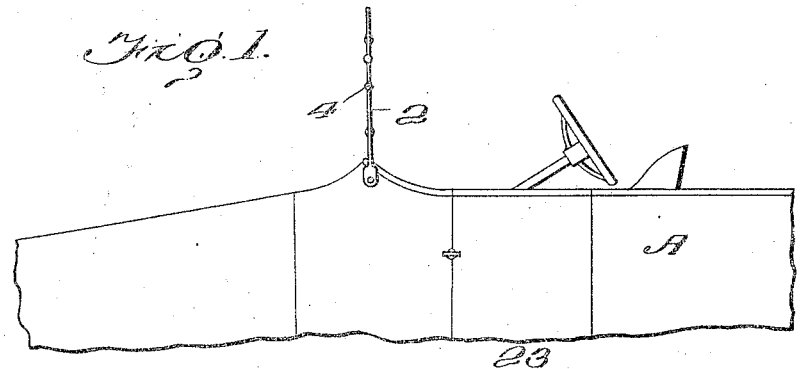
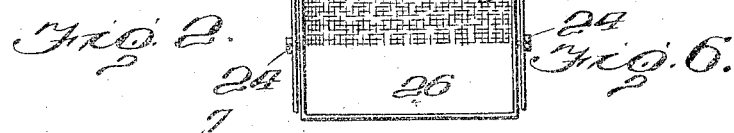
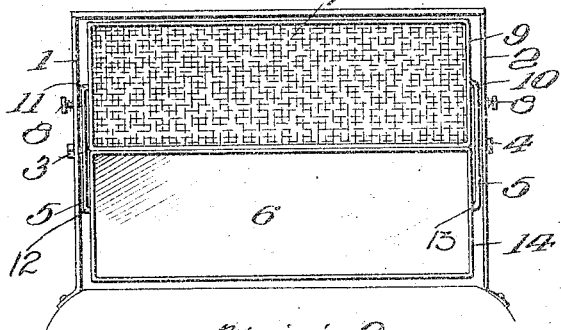
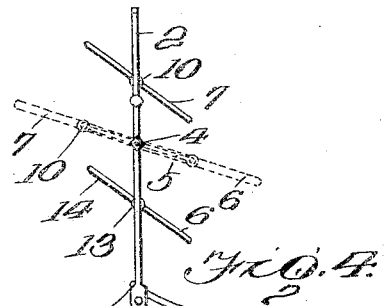
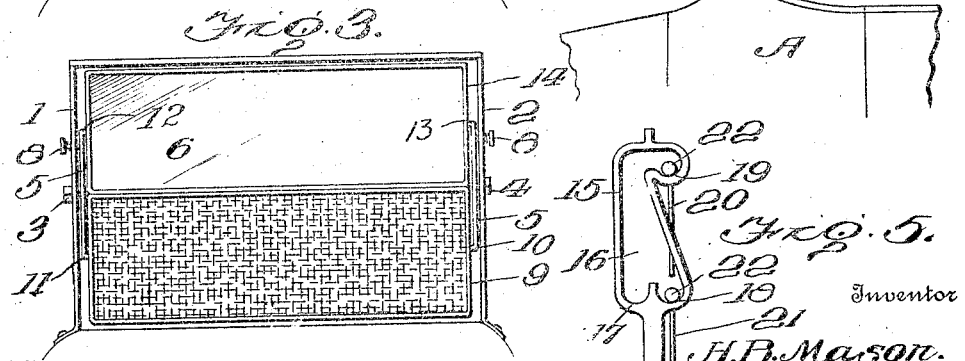
Inventor
H. B. Mason.

UNITED STATES PATENT OFFICE.

HUGH B. MASON, OF SAN BERNARDINO, CALIFORNIA.

WIND-SHIELD FOR AUTOMOBILES.

1,317,520.  Specification of Letters Patent.  Patented Sept. 30, 1919.

Application filed July 7, 1916. Serial No. 107,985.

*To all whom it may concern:*

Be it known that I, HUGH B. MASON, a citizen of the United States, residing at San Bernardino, in the county of San Bernardino, State of California, have invented certain new and useful Improvements in Wind-Shields for Automobiles, of which the following is a description, reference being had to the accompanying drawing and to the figures of reference marked thereon.

My invention relates to improvements in wind shields for automobiles.

An object of my invention is to provide an adjustable wind shield having one portion of colored glass and the other portion of plain glass and so mounted that either portion can be moved in the upper position in the line of vision of the operator of the automobile.

A further object of my invention is to provide a wind shield of the above character which is simple in construction and effective in operation, and having certain details of structure and arrangement of parts hereinafter more fully described.

In the accompanying drawings:—

Figure 1 is a side elevation of an automobile showing my improved wind shield applied thereto;

Fig. 2 is a front view of Fig. 1, but showing the colored glass section in the upper position;

Fig. 3 is a front view showing the colored glass in the lower position;

Fig. 4 is an enlarged side view showing in dotted lines the adjustment of the two sections and the adjustment of the two sections as a whole, to bring the colored section in or out of alinement with the vision of the operator;

Fig. 5 is a side elevation showing a modified form of means for adjusting the colored or plain section in alinement with the vision of the operator; and Fig. 6 is a front view of another modified form of wind shield.

Referring now to the drawings, A represents the automobile or the like to which my improved shield is applied. The shield consists of the two side arms 1 and 2 secured to the automobile in any desired manner and extending above the glass section to form stays or supports for the top of the automobile, which is well understood and needs no further description. The side arms have pivoted therebetween by pivots 3 and 4 the frame 5 which is adapted to support the plain and colored glass sections 6 and 7. The side arms 1 and 2 are each provided with a spring-actuated bolt 8 extending therethrough and adapted to enter openings in the frame 5 whereby said frame is held in a vertical position and yet may be rocked upon the pivots 3 and 4 so as to bring either the plain or colored glass sections in the upper position.

The frame 5 has pivoted in its upper end, the frame 9 supporting the colored glass section 7. Said frame in turn is supported by means of pivots 10 and 11 and whereby the said section may be adjusted so as to allow the air to pass through the shield. This upper or colored glass section is held in its adjusted position by friction on the pivots 10 and 11 or in any well known manner. The frame 5 at its lower end has pivots 12 and 13 on which is mounted the frame 14 supporting the plain glass section 6 and which, like the frame 9, can be adjusted so as to allow the air to pass through the shield and to allow vision therethrough completely void of glass. This frame is also held in its adjusted position in the same manner as the frame 9.

In the modification shown in Fig. 5 of the drawings, the side arms are provided with broadened portions 15 which are provided with slots 16 having at their lower ends the semi-circular recesses 17 and 18. The slots 16 at their upper ends are provided with semi-circular recesses 19 at one side. The plain and colored glass sections 20 and 21 have pivots 22 at their upper ends which enter the slots and are adapted to normally rest in the semi-circular recesses 19 and 18 whereby the sections are in vertical alinement. When it is desired to lower the plain glass section 20 and raise the colored glass section 21, the pivots of the section 20 are raised from the recesses 19 and lowered in the recesses 17. The colored glass section 21 is raised from the recesses 18 and placed in the recesses 19. The pivots of the plain glass frame are raised from the recesses 17 and moved horizontally and placed in the recesses 18.

From the foregoing, it will be readily seen that the plain and colored glass frames can be interchanged so that either may be in a line of vision of the operator or both may be lowered with their pivots resting in the recesses 17 and 18.

In the preferred form, it is understood that it is only necessary to withdraw the spring bolts 8 and the frame 5 can be swung on its pivots 3 and 4, and thus either the plain or colored glass section can be moved in an upper position in a line of vision of the operator of the automobile.

In the modification shown in Fig. 6 I have shown a single section 23 pivoted at 24 and having a pane of glass therein in which the upper portion 25 is colored and the lower section of plain glass or it may be made with two pieces of glass of different color.

It is obvious that minor changes in the details of construction and arrangement of parts may be made without departing from the spirit of the invention as set forth in the appended claims.

Having thus described my invention, what I claim as new and desire to secure by Letters-Patent is:—

1. A wind shield comprising a supporting frame including parallel side members, similar glass sections which extend from one side member to the other, one of said glass sections being plain and the other colored, a supporting frame for each glass section, a frame pivoted to said side members and supporting the frame carrying the glass sections, said pivots for the frame being in alinement with the adjacent edges of the glass sections, said frames carrying the glass sections each being pivoted on a line passing centrally and longitudinally through the glass sections, means for holding the frame pivoted to the side members in adjusted positions, and means for holding the frames carrying the glass sections in adjusted positions on their supporting pivots.

2. A wind shield comprising a supporting frame including parallel side arms, similar glass sections each extending from one side arm to the other, a supporting frame for each glass section, a frame pivoted to said side arms and supporting the frames carrying the glass sections, said pivots being disposed in alinement with the adjacent edges of the glass sections, said frames carrying the glass sections each being pivoted on a line passing centrally and longitudinally through the glass section, means for holding the frame pivoted to the side arms in adjusted positions and means for holding the frames carrying the glass sections in adjusted positions on their supporting pivots.

In testimony whereof, I affix my signature in the presence of two witnesses.

HUGH B. MASON.

Witnesses:
 H. R. SCOTT,
 JAMES H. BOYD.